(12) United States Patent
Wachsman et al.

(10) Patent No.: US 11,978,938 B2
(45) Date of Patent: May 7, 2024

(54) STABLE HIGH CONDUCTIVITY OXIDE ELECTROLYTE

(71) Applicant: University of Maryland, College Park, College Park, MD (US)

(72) Inventors: Eric D. Wachsman, Fulton, MD (US); Adam Jolley, College Park, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 17/990,664

(22) Filed: Nov. 19, 2022

(65) Prior Publication Data

US 2023/0088369 A1    Mar. 23, 2023

Related U.S. Application Data (62) Division of application No. 16/521,462, filed on Jul. 24, 2019, now Pat. No. 11,539,065.

(60) Provisional application No. 62/702,730, filed on Jul. 24, 2018.

(51) Int. Cl.
*H01M 8/1246* (2016.01)
*H01M 8/12* (2016.01)

(52) U.S. Cl.
CPC .. *H01M 8/1266* (2013.01); *H01M 2008/1293* (2013.01); *H01M 2300/002* (2013.01); *H01M 2300/0074* (2013.01)

(58) Field of Classification Search
CPC ............ H01M 8/1246; H01M 8/1266; H01M 2300/0065; H01M 2300/0068; H01M 2300/0071; H01M 2300/0074; H01M 2008/1293
See application file for complete search history.

(56) References Cited

FOREIGN PATENT DOCUMENTS

JP    S59227727    * 12/1984

OTHER PUBLICATIONS

Sammes et al., "Bismuth Based Oxide Electrolytes—Structure and Ionic Conductivity," 1999, Journal of the European Ceramic Society, 19, 1801-1826. (Year: 1999).*

Shuk et al. "Oxide ion conducting solid electrolytes based on Bi2O3," 1996, Solid State Ionics, 89, 179-196. (Year: 1996).*

* cited by examiner

*Primary Examiner* — Matthew W Van Oudenaren
(74) *Attorney, Agent, or Firm* — Don D. Cha; HDC Intellectual Property Law, LLP (57) ABSTRACT

The present invention relates to rhomboidal phase bismuth oxide that maintains electric conductivity of at least about $1\times10^{-2}$ S/cm at temperature of about 500° C. for at least about 100 hours. In particular, the bismuth oxides of the invention have stable conductivity at a temperature range from about 500° C. to about 550° C.

20 Claims, 12 Drawing Sheets

STABLE HIGH CONDUCTIVITY OXIDE ELECTROLYTE

CROSS-REFERENCE TO RELATED APPLICATIONS

This application is a divisional of U.S. patent application Ser. No. 16/521,462, filed Jul. 24, 2019, which claims the priority benefit of U.S. Provisional Application No. 62/702,730, filed Jul. 24, 2018, which is incorporated herein by reference in its entirety.

STATEMENT REGARDING FEDERALLY FUNDED RESEARCH

This invention was made with government support under DE-AR0000494 awarded by the U.S. Department of Energy. The government has certain rights in the invention.

FIELD

The present invention relates to a bismuth oxide material that maintains electric conductivity of at least about $1\times10^{-2}$ S/cm at temperature of about 500° C. for at least about 100 hours. In particular, the bismuth oxides of the invention are phase-stable. Such bismuth oxides comprise a dopant to form rhombohedral phase.

BACKGROUND

Solid oxide fuel cells (SOFCs) are a promising technology for efficient and high power energy conversion of hydrocarbon fuels. One of the main barriers to commercialization and widespread use is the high temperatures (≥800° C.) required for operation. Currently, the highest oxygen ion conducting electrolyte, cubic bismuth oxide, is only useable above 600° C. due to structural instability (anion ordering) below this temperature.

Above approximately 730° C., pure $Bi_2O_3$ exists in the face centered cubic phase (FCC or δ-cubic) and exhibits a greater oxygen ion conductivity than any known oxygen ion conductor. As the operating temperature reaches below 730° C., $Bi_2O_3$ transitions through a set of lower symmetry phases including the monoclinic phase, which ultimately lowers the ionic conductivity by orders of magnitude. Traditionally, cations with a smaller ionic radius than $Bi^{+3}$ are used to stabilize the high symmetry δ-cubic phase to room temperature to protect the highly conductive cubic phase. Although this substituted δ-cubic phase exhibits superior conductivity initially, below approximately 600° C. the oxygen ion sublattice begins to order and the ionic conductivity drops significantly over time. For example, 20% Er-doped $Bi_2O_3$ (ESB) is a standard doped $Bi_2O_3$ electrolyte in the δ-cubic phase that undergoes oxygen ion ordering, making it a poor candidate for a high performing solid oxide fuel cells (SOFCs) below 600° C. due to the inherent degradation of conductivity.

By decreasing the operational temperature below 600° C., it is possible to achieve reduced manufacturing and processing costs, an increase in theoretical efficiency, and a decrease in the mechanisms that cause degradation.

Therefore, there is a need for a stable conductivity electrolytes that can operate efficiently at an operating temperature below 600° C.

SUMMARY

Some aspects of the invention are based on discovery by the present inventors that by changing the crystal lattice structure of bismuth oxide ($Bi_2O_3$) one can achieve a stable conductivity electrolyte that can operate efficiently at an operating temperature below 600° C. In one particular embodiment, it was found that forming the rhombohedral phase in $Bi_2O_3$ allows one to bypass the ordering phenomena observed in the δ-cubic phase, while also maintaining high enough symmetry to promote ample oxygen ion mobility.

One particular aspect of the invention provides a rhombohedral bismuth oxide that maintains electric conductivity of at least about $1\times10^{-2}$ S/cm at temperature of about 500° C. for at least about 100 hours, typically for at least 150 hours, often for at least 200 hours, and most often for at least 300 hours.

In some embodiments, the rhombohedral bismuth oxide comprises a first dopant and optionally a second dopant. In some instances, each of the dopant is independently selected from the group consisting of a lanthanide metal, a rare-earth metal, an alkali-earth metal, and a transition metal. In one particular embodiment, each of said dopant is independently selected from the group consisting of La, Sm, Nd, Sr, Y, Er, Dy, Gd, Ca, and Yb. Still in another particular embodiment, the at least one of the dopant is lanthanum. In one particular embodiment, the dopant includes at least one lanthanide metal. Yet in another specific embodiment, the dopant includes lanthanum.

Still in other embodiments, the amount of bismuth ranges from about 70% to about 95%, typically from about 80% to about 95%, often from about 85% to about 95%, and more often from about 90% to about 95% of the total metal content.

Yet in other embodiments, the total amount of dopant ranges from about 2% to about 20%, typically from about 3% to about 15%, and often from about 4% to about 10% of the total metal content. In some embodiments, the amount of dopant is about 10% or less of the total metal content. It should be appreciated that conversely in this latter specific embodiment, the total amount of bismuth oxide is greater than 90%. Alternatively, the amount of bismuth is greater than 90% of the total metal content. Throughout this disclosure, when referring to the amount of dopant relative to $Bi_2O_3$ or bismuth, it should be appreciated that the amount refers to molar amount of dopant metal relative to molar amount of bismuth metal in the material.

In one specific embodiment, the rhombohedral bismuth oxide is selected from the group consisting of LaY—$Bi_2O_3$, LaSm—$Bi_2O_3$, SrY—$Bi_2O_3$, Nd—$Bi_2O_3$, LaEr—$Bi_2O_3$, NdDy—$Bi_2O_3$, Nd—$Bi_2O_3$, Sm—$Bi_2O_3$, NdSm—$Bi_2O_3$, NdGd—$Bi_2O_3$, and CaGd—$Bi_2O_3$.

Yet another aspect of the invention provides a doped rhombohedral bismuth oxide that is phase-stable in a temperature range from about 10° C. to about 600° C., typically from about 10° C. to about 550° C., often from about 20° C. to about 550° C. The doped rhombohedral bismuth oxide maintains electric conductivity of at least about $1\times10^{-2}$ S/cm at temperature of about 500° C. for at least about 100 hours, typically for at least 150 hours, often for at least 200 hours, and most often for at least 300 hours.

In some embodiments, the amount of bismuth in the doped rhombohedral bismuth oxide ranges from about 70% to about 95%, typically from about 80% to about 95%, often from about 85% to about 95%, and more often from about 90% to about 95% of the total metal content.

Yet in other embodiments, the doped rhombohedral bismuth oxide comprises at least two dopants. In some instances, the doped rhombohedral bismuth oxide comprises two dopants.

Still in other embodiments, the doped rhombohedral bismuth oxide comprises a first dopant and optionally a second dopant. Typically, each of the dopant is independently selected from the group consisting of a lanthanide metal, a rare-earth metal, an alkali-earth metal, and a transition metal.

In one particular embodiment, each of the dopant is independently selected from the group consisting of La, Sm, Nd, Sr, Y, Er, Dy, Gd, Ca, and Yb. In one particular embodiment, the dopant includes at least one lanthanide metal. Yet in another specific embodiment, the dopant includes lanthanum.

Still in other embodiments, the total amount of said dopant ranges from about 2% to about 20%, typically from about 3% to about 15%, and often from about 4% to about 10% of the total metal content. In some embodiments, the amount of dopant is about 10% or less of the total metal content. It should be appreciated that conversely in this latter specific embodiment, the total amount of bismuth oxide is greater than 90%. Alternatively, the amount of bismuth is greater than 90% of the total metal content.

Still another aspect of the invention provides a solid oxide fuel cell comprising a rhombohedral bismuth oxide disclosed herein. In some embodiments, the amount of bismuth in the rhombohedral bismuth oxide ranges from those described herein.

Yet still in another aspect of the invention provides a method for producing a bismuth oxide having a stable electric conductivity at a temperature range from about 10° C. to about 550° C., such as those disclosed herein. The method typically includes doping a bismuth oxide with a dopant to produce rhombohedral bismuth oxide.

In one particular embodiment, the method of doping the bismuth oxide comprises:

admixing solid bismuth oxide with a dopant to produce a powder mixture;

calcining said powder mixture at a temperature of at least 600° C.; and sintering said calcined mixture to produce said rhombohedral bismuth oxide.

DETAILED DESCRIPTION

When referring to a numerical value, the terms "about" and "approximately" are used interchangeably herein and refer to being within an acceptable error range for the particular value as determined by one of ordinary skill in the art, which will depend in part on how the value is measured or determined, e.g., the limitations of the measurement system, i.e., the degree of precision required for a particular purpose. For example, the term "about" typically means within 1 standard deviation, per the practice in the art. Alternatively, the term "about" can mean ±20%, typically ±10%, often ±5% and more often ±1% of the numerical value. In general, however, where particular values are described in the application and claims, unless otherwise stated, the term "about" means within an acceptable error range for the particular value.

The term "stable" when referring to rhombohedral bismuth oxide means that at least about 70%, typically at least about 80%, often at least about 90%, and more often at least about 95% of the rhombohedral crystal lattice structure of bismuth oxide is maintained under the given conditions (e.g., at 550° C. for at least 100 h, typically at least 150 h, often at least about 200 h, and most often at least 300 h). In another embodiment, the term "stable" refers to ability of bismuth oxides of the invention to maintain conductivity with no/minimal decay. In some embodiments, bismuth oxides of the invention maintain stable conductivity within the given conditions with no more than about 25%, typically no more than about 20%, often no more than about 15%, more often no more than about 10%, and most often no more than about 5% loss or decay in conductivity at given conditions (e.g., at 550° C. for at least 100 h, typically at least 150 h, often at least about 200 h, and most often at least 300 h).

Some aspects of the invention are based on the discovery by the present inventors by forming the rhombohedral phase of $Bi_2O_3$ to bypass the ordering phenomena observed in the δ-cubic phase, while also maintaining high enough symmetry to promote ample oxygen ion mobility. Forming the rhombohedral phase in $Bi_2O_3$ is highly dependent on the size and amount of dopant present in the lattice. The present inventors have previously shown that utilizing lanthanide elements with a radius $\leq Gd^{+3}$ will stabilize the δ-cubic phase, while $\geq Sm^{+3}$ forms the rhombohedral phase.

In one particular embodiment, the phase stability of rhombohedral $Bi_2O_3$ has been achieved by substituting the bismuth site with less than 10% dopant to improve conductivity. While the rhombohedral phase initially exhibited lower conductivity than cubic phase at 500° C., its enhanced stability led to higher conductivity after less than one hundred hours at temperature.

A fast oxygen ion conductor that exhibits stable conductivity is also beneficial in a composite cathode design for SOFCs. $Bi_2O_3$ electrolyte material can be mixed with materials such as lanthanum manganese oxide (LSM) to produce a high performance composite cathode. It has been shown that an LSM-ESB cathode exhibits low ohmic and non-ohmic ASR. In the composite cathode design, the LSM portion catalyzes oxygen gas and transport electrons while the $Bi_2O_3$ portion works to transport the oxygen ions to the electrolyte.

The ASR can be reduced and long term stability of a SOFC can be improved by utilizing a rhombohedral $Bi_2O_3$ electrolyte and a rhombohedral $Bi_2O_3$/LSM composite cathode below 600° C. The present invention is based at least in part on the discovery that low dopant concentration rhombohedral phase $Bi_2O_3$ results in a high conductivity and a relatively long stability as well as cathode performance and stability of $Bi_2O_3$/LSM composite cathodes.

The amount bismuth oxide in the invention will typically have a substantial quantity (e.g., greater than about 80%, typically greater than about 85%, often greater than about 90%, more often greater than about 95%, and most often greater than about 98%) of rhombohedral phase, and negligible or very small quantity of cubic phase, i.e., δ-cubic phase.

Dopants useful in the invention include entire lanthanide series, entire alkali-earth metal series, entire transition metal series, and entire rare-earth metal series.

Bismuth oxides of the invention can be used in a wide variety of electronics such as, but not limited to, solid state gas sensors (e.g., to control air/fuel ratio and control emissions), ion-transport membranes for oxygen separation and purification (e.g., for biomedical and aerospace application), batteries, components of batteries (e.g., as a cathode). Other uses for bismuth oxides of the invention are readily recognized by one skilled in the art having read the present disclosure.

Additional objects, advantages, and novel features of this invention will become apparent to those skilled in the art upon examination of the following examples thereof, which are not intended to be limiting.

EXAMPLES

All electrolyte materials were synthesized using a standard solid-state synthesis route.

$Bi_2O_3$ (Alfa Aesar 99.99%) was mixed with the stoichiometric amounts of dopant to make each sample. The dopant materials are $Dy_2O_3$(Alfa Aesar 99.9%), $Nd_2O_3$ (Sigma Aldrich 99.9%), $Gd_2O_3$ (Alfa Aesar 99.9%), $Er_2O_3$ (Alfa Aesar 99.9%), $Sm_2O_3$ (Alfa Aesar 99.9%), $Y_2O_3$ (Alfa Aesar 99.9%), $Yb_2O_3$ (Alfa Aesar 99.9%), $CaCO_3$ (Carolina lab grade), $SrCO_3$ (Sigma Aldrich 99.9%). The raw powders were ball milled for 24 hours in ethanol and dried prior to calcination.

The samples were calcined at 800° C. for 16 hours and heated and cooled at a rate of 5° C. per minute.

After calcining, the samples were hand ground with a mortar and pestle before being ball milled for 24 hours in ethanol. The samples were dried and then pressed into disks using a 10 mm steel die. The disks were then sintered at 800° C. for 16 hours with a heating and cooling rate of 5° C. per minute.

The composite cathode was produced by ball milling the calcined $Bi_2O_3$ material with LSM powder (Fuel Cell Materials) in ethanol for 24 hours in a 6:4 ratio by weight. The slurry was then blended in a Thinky centrifugal mixer and the ethanol was slowly replaced with a vehicle for the cathode powder (ESL type 441 thinner). Once the paste reached an optimal consistency, it was screen printed on to a dense electrolyte pellet and sintered at 775° C. for 2 hours with a heating and cooling rate of 5° C. per minute.

Room temperature X-ray diffraction was performed with a Bruker D8 X-ray Diffractometer with Cu Kα radiation and the Le Bail method was used to determine the lattice parameters.

Electrochemical impedance spectroscopy (EIS) measurements were performed using a Solartron 1260a. Sintered pellets faces were covered with conductive gold paste and fired at 750° C. for fifteen minutes. Samples were tested in air at elevated temperatures using silver wires.

Conductivity and cathodic ASR was determined from fitting the EIS spectra with Scribner Z-View software and the impedance was normalized by the pellet dimensions and the cathode area.

Figure 1:
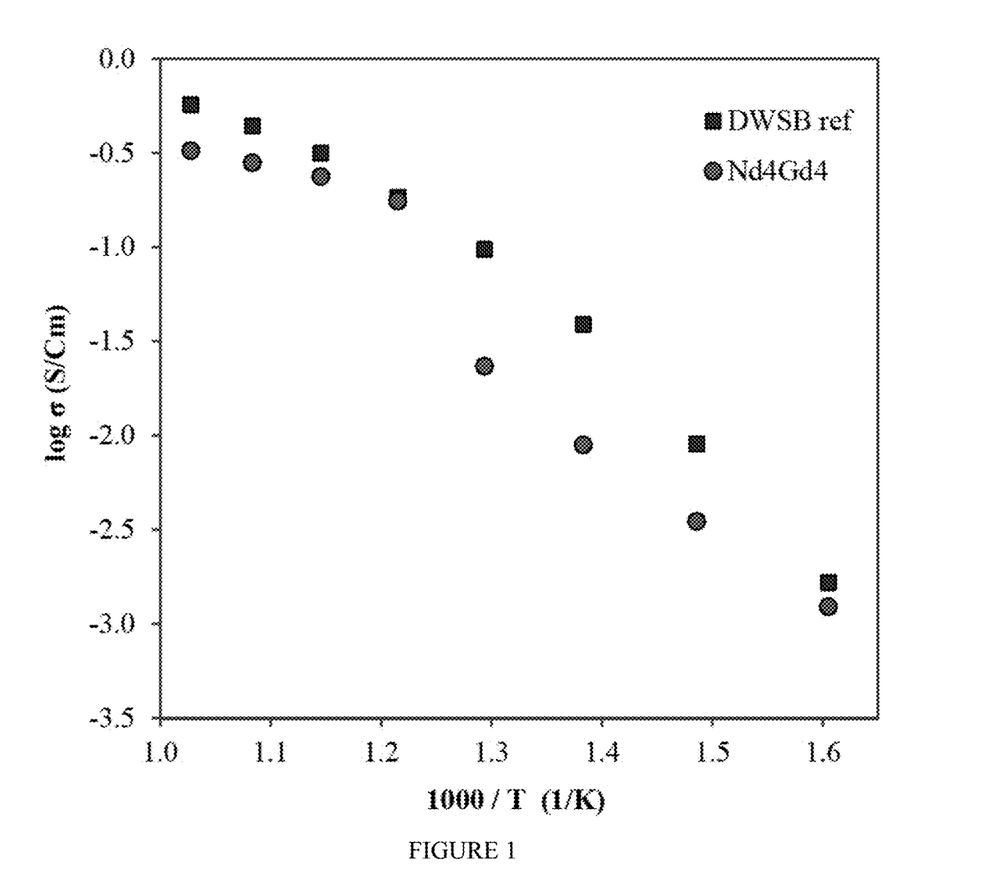
FIG. 1 shows Arrhenius plot from 700° C. to 350° C. for 4% Nd-doped and 4% Gd-doped $Bi_2O_3$ (Nd4Gd4) and 8% Dy-doped and 4% W-doped $Bi_2O_3$ (DWSB). DWSB is a reference $Bi_2O_3$ material in the FCC phase.
Figure 2:
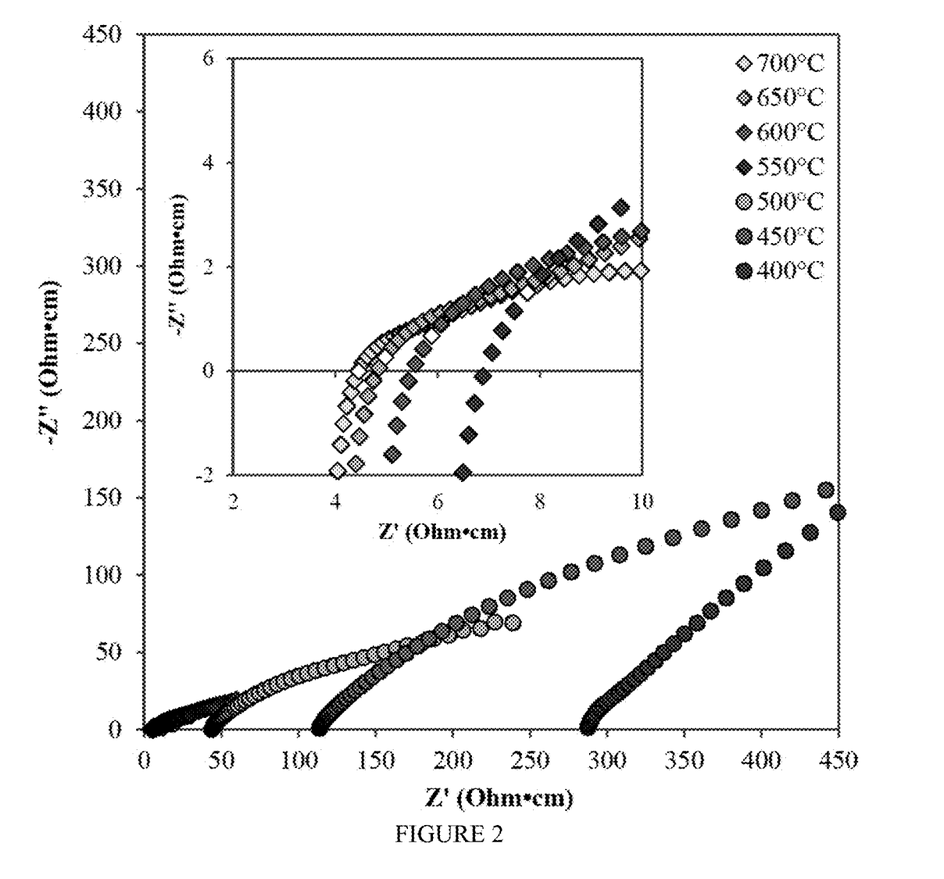
FIG. 2 is Nyquist plots from 700° C. to 400° C. for Nd4Gd4. The inset is zoomed in on the data from 700° C. to 550° C. The open circles signify the impedance at a frequency of 1 hz in the main plot and 10 khz in the insert.

The rhombohedral $Bi_2O_3$ samples of the invention did not appear to maintain a constant phase from the sintering temperature down to room temperature. Traditionally, $Bi_2O_3$ is doped to sufficiently stabilize the δ-cubic phase from the firing temperature all the way down to room temperature. Without being bound by any theory, it appears due to the decreased substitution of bismuth in rhombohedral $Bi_2O_3$, the rhombohedral phase was only retained from room temperature up to approximately 550° C. FIG. 1 depicts the Arrhenius plot of 4% Nd-doped and 4% Gd-doped $Bi_2O_3$ ("Nd4Gd4"). The Arrhenius plot of Nd4Gd4 is representative of typical behavior shown by the other rhombohedral $Bi_2O_3$ of the invention. From this figure it is clear that there is a high temperature phase that transforms to a low temperature phase below approximately 550° C. The high temperature phase has activation energy of 0.357 eV while the low temperature phase has activation energy of 0.868 eV. FIG. 2 shows the Nyquist plots of Nd4Gd4 from 700° C. to 400° C., and is representative of the raw EIS data collected for representative samples measured in this invention.

Figure 3:
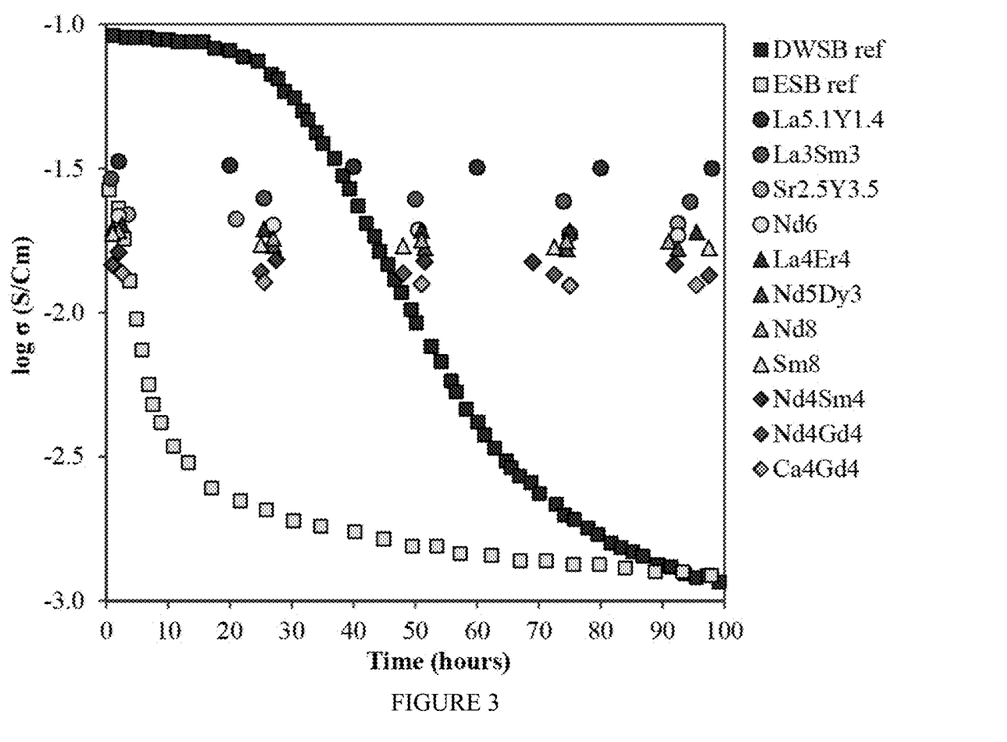
FIG. 3 is a plot of conductivity vs. time at 500° C. for various doped $Bi_2O_3$ samples. The name signifies the dopant, and the number after the dopant signifies the amount of the bismuth site that was substituted. DWSB and ESB are reference $Bi_2O_3$ materials in the FCC phase.
Figure 4A:
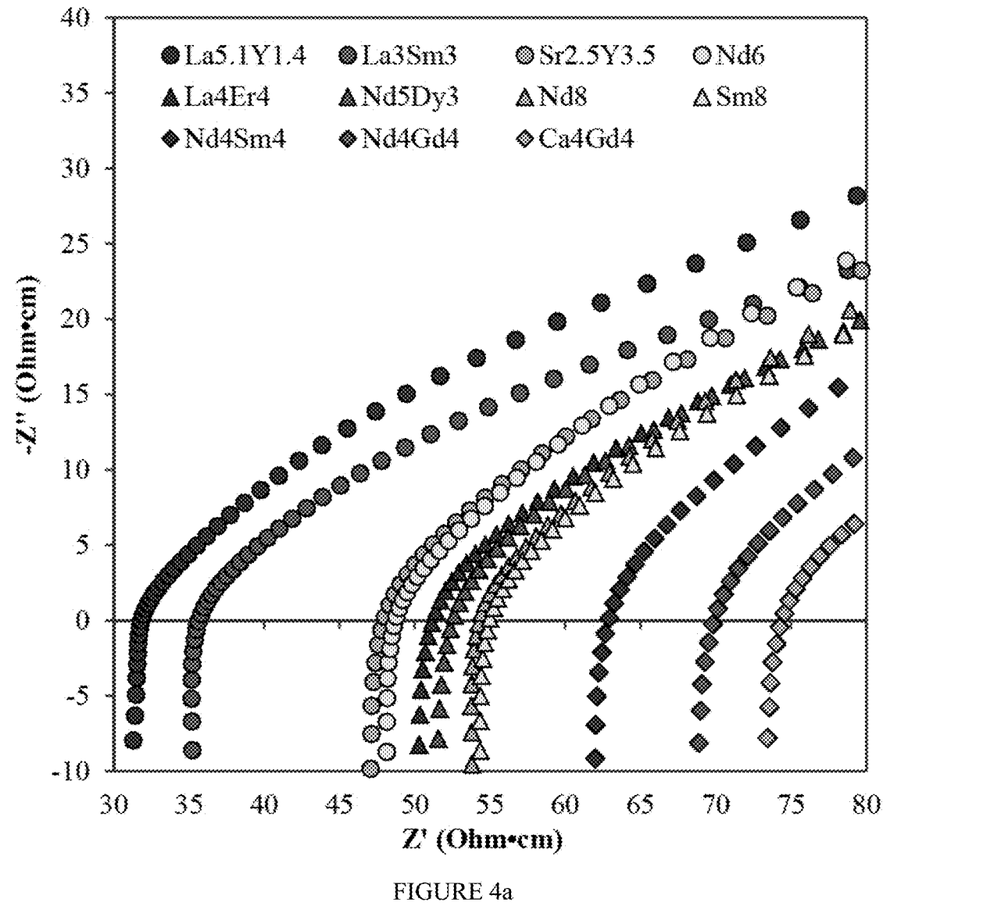
FIG. 4a is Nyquist plots of the initial impedance for various doped $Bi_2O_3$ samples at 500° C. The name signifies the dopant, and the number after the dopant signifies the amount of the bismuth site that was substituted. The plot is zoomed in to show the high frequency data attributed to the total conductivity of the sample.
Figure 4B:
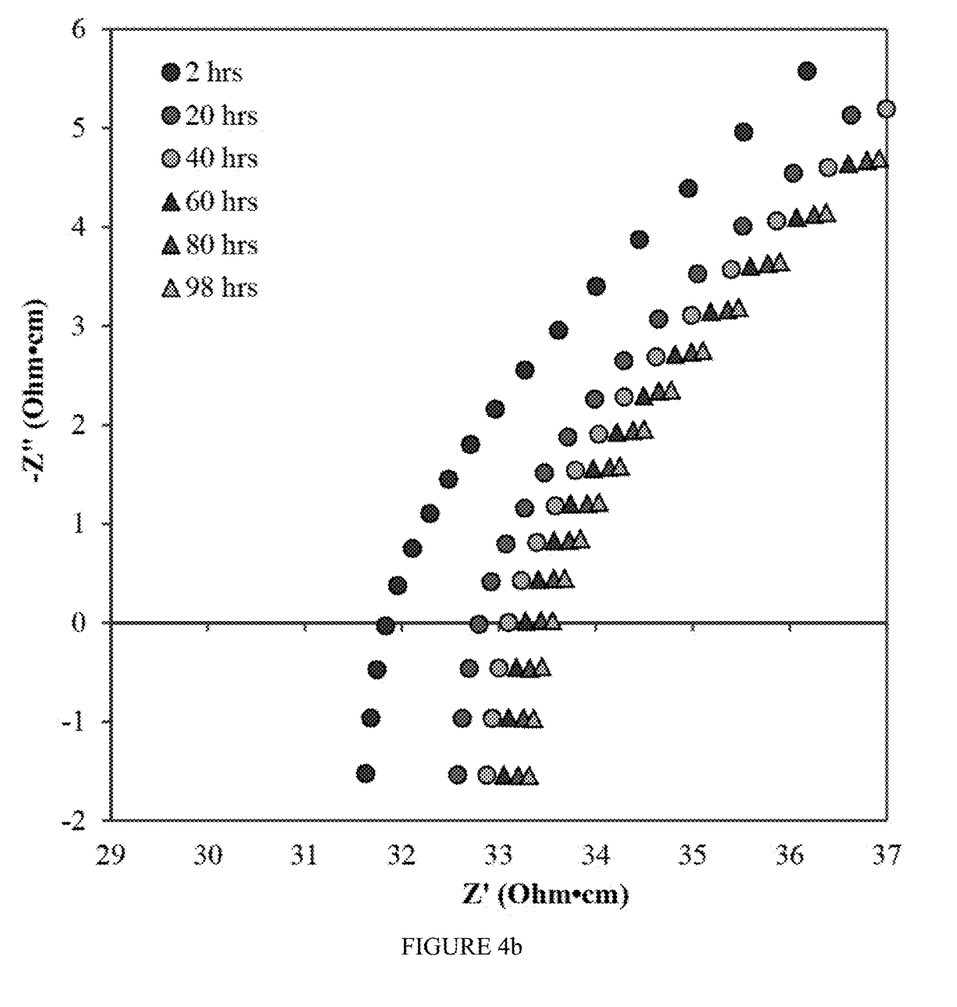
FIG. 4b is Nyquist plots of 5.1% La-doped and 1.4% Y-doped $Bi_2O_3$ (LYBO) as a function of aging time at 500° C. The plot is zoomed in to show the high frequency data attributed to the total conductivity of the sample.

While rhombohedral $Bi_2O_3$ undergoes a phase change at elevated temperatures, it maintained stable conductivity at lower temperatures (≤~550° C.). Meanwhile cubic $Bi_2O_3$ maintained constant phase at 500° C., but experienced a degradation of conductivity. Again without being bound by any theory, it is believed that the decay in conductivity of the δ-cubic phase is associated with the ordering of oxygen ions related to the three-fold symmetry of the FCC unit cell. While at high temperatures the three-fold symmetry is what helps give $Bi_2O_3$ its characteristically high conductivity, at lower temperatures the symmetry works against oxygen ion mobility. As discovered by the present inventors, by purposely lowering the symmetry of the unit cell through doping $Bi_2O_3$, the ordering phenomena can be avoided altogether. FIG. 3 shows the stability in conductivity for many different doped $Bi_2O_3$ of the invention, except for ESB and DWSB ("reference materials") which were studied previously. The reference materials are pure δ-cubic $Bi_2O_3$ and the rest of samples range from pure rhombohedral phase to a mixture of rhombohedral and tetragonal phase $Bi_2O_3$. FIG. 4a is the Nyquist plot of the initial impedance data for all plotted samples in FIG. 3. FIG. 4b is the Nyquist plot of the EIS data collected for La5.1Y1.4 (LYBO), i.e., 5.1% La and 1.4% Y doped $Bi_2O_3$, as function of aging time. The stability in conductivity at 500° C. demonstrates that the less symmetric $Bi_2O_3$ phase or phases do not undergo ordering like the δ-cubic phase, but still maintain a conductivity greater than $1 \times 10^{-2}$ S/cm.

Figure 5:
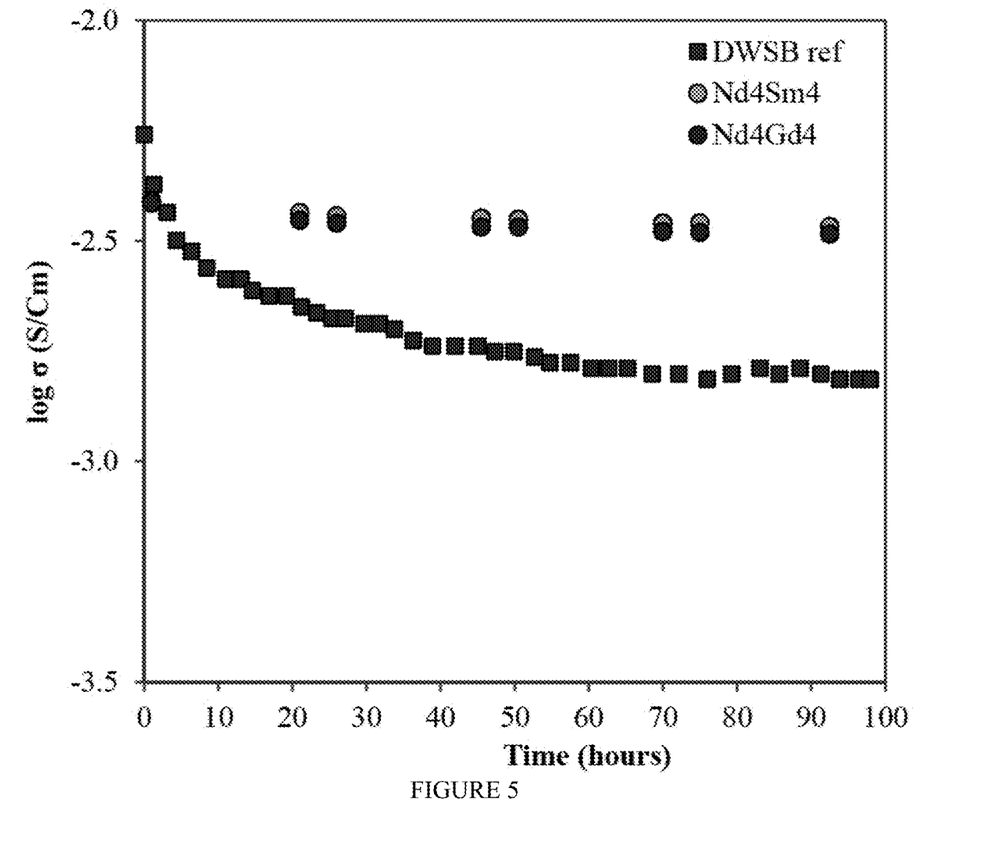
FIG. 5 is a graph of conductivity vs. time at 400° C. for Nd4Gd4 and Nd4Sm4. DWSB is a reference $Bi_2O_3$ material in the FCC phase.
Figure 6:
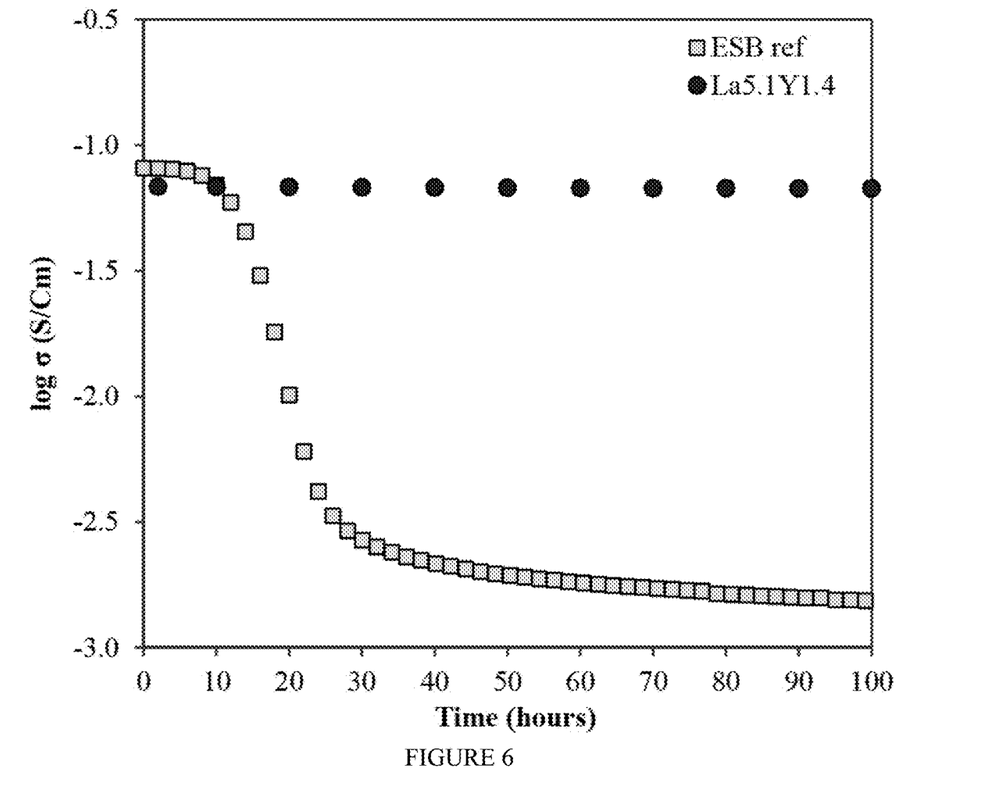
FIG. 6 is a graph of conductivity vs. time at 550° C. for La5.1Y1.4 (LYBO). ESB is a reference $Bi_2O_3$ material in the FCC phase.

Furthermore because these materials maintain the rhombohedral phase from room temperature up to approximately 550° C., the conductivity is stable over a large temperature range. FIG. 5 is representative of rhombohedral $Bi_2O_3$ being aged at 400° C. Both Nd4Gd4 and Nd4Sm4 exhibited very little degradation of conductivity due to the stability of the rhombohedral phase at 400° C. FIG. 6 also reinforces the stability of the rhombohedral phase up to 550° C. as LYBO exhibited steady conductivity for one hundred hours at 550° C.

While all rhombohedral $Bi_2O_3$ of the invention exhibited stable conductivity, it is clear that the type of dopant and dopant concentration play a role in the conductivity of the sample. Neodymium doped bismuth oxide demonstrates an important relationship between dopant concentration, phase, and conductivity in the low dopant region. Table 1 contains the lattice parameters of Nd-doped $Bi_2O_3$. Based on the results summarized in Table 1 the rhombohedral phase is stable below 10% Nd substitution, but a secondary tetragonal phase appears to form at ≤6.5% dopant. While the lattice parameters were determined for the 6% doped sample, the tetragonal peaks in the 6.5% sample had too low of an intensity to fit. In the low dopant region, the rhombohedral c lattice parameter showed a linear increase with decreasing dopant amount. The volume of unit cell meanwhile increased with dopant concentration initially, but flat lined after 7% substitution was reached. The leveling of the unit cell volume seems to occur at the boundary between the two-phase region.

TABLE 1

Lattice parameters and volume of the rhombohedral (R-3m) unit cell. Sample name describes dopant cation and percent of bismuth substitution. Numbers in the bracket are the lattice parameters and volume of the tetragonal (I4/mmm) unit cell.

| Sample | a(Å) | c(Å) | Volume(Å) |
|---|---|---|---|
| Nd6 | 3.9622(2) [3.8913(1)] | 28.0901(9) [5.6600(2)] | 381.90(3) |
| Nd6.5 | 3.9631(2) | 28.070(1) | 381.80(4) |
| Nd7 | 3.9648(2) | 28.055(1) | 381.93(3) |
| Nd7.5 | 3.9649(2) | 28.044(1) | 381.79(4) |
| Nd8 | 3.9662(2) | 28.010(1) | 381.58(3) |
| Nd9 | 3.9675(1) | 27.964(1) | 381.15(3) |

Figure 7:
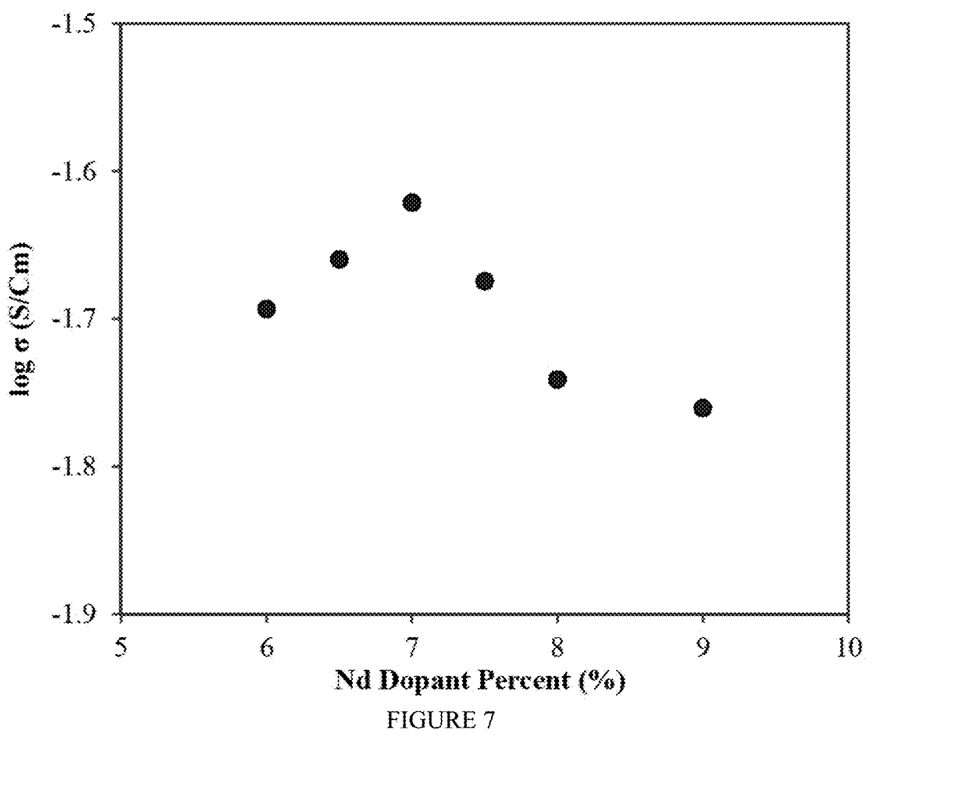
FIG. 7 is a graph of conductivity at 500° C. versus the amount of neodymium doped in the bismuth site of $Bi_2O_3$. Conductivity was measured after holding the sample at temperature for twenty hours.

FIG. 7 illustrates conductivity as a function of Nd-dopant concentration in $Bi_2O_3$. This figure demonstrates that within a single phase region a decrease in dopant concentration provides an increase in oxygen ion conductivity. Decreasing the overall substitution appears to increase the polarizability of the bismuth oxide lattice which results in an increase in conductivity. As the dopant level was dropped further, a secondary tetragonal phase began to form at 6.5% dopant amount, and a drop in conductivity was observed. The drop in conductivity in the two-phase region reinforces that the rhombohedral phase of $Bi_2O_3$ is more conductive than the tetragonal phase.

The conductivity appears to be maximized when the dopant concentration was minimized, while still maintaining a phase stable rhombohedral structure. Although phase stability and low dopant concentration effected oxygen ion conductivity in the $Bi_2O_3$ lattice, there were other factors that contribute to the conductivity.

While dopant concentration affected the phase and conductivity of $Bi_2O_3$, the type of dopant and the ionic radius of the dopant also had an impact. When there was an 8% substitution of bismuth for neodymium (Nd8), $Bi_2O_3$ forms an entirely rhombohedral phase. With a coordination of eight, $Nd^{+3}$ has an ionic radius of 110.9 pm. When the ionic radius of the 8% dopant was dropped to 107.9 pm, or the ionic radius of $Sm^{+3}$, $Bi_2O_3$ formed a mixed rhombohedral and tetragonal phase. The small amount of tetragonal phase that formed in Sm8 (i.e., 8% doping with Sm) may explain why the conductivity of this sample is lower than that of Nd8. Although Nd8 had higher conductivity than Sm8, variation in conductivity was also observed for a set dopant ionic radius.

Figure 8:
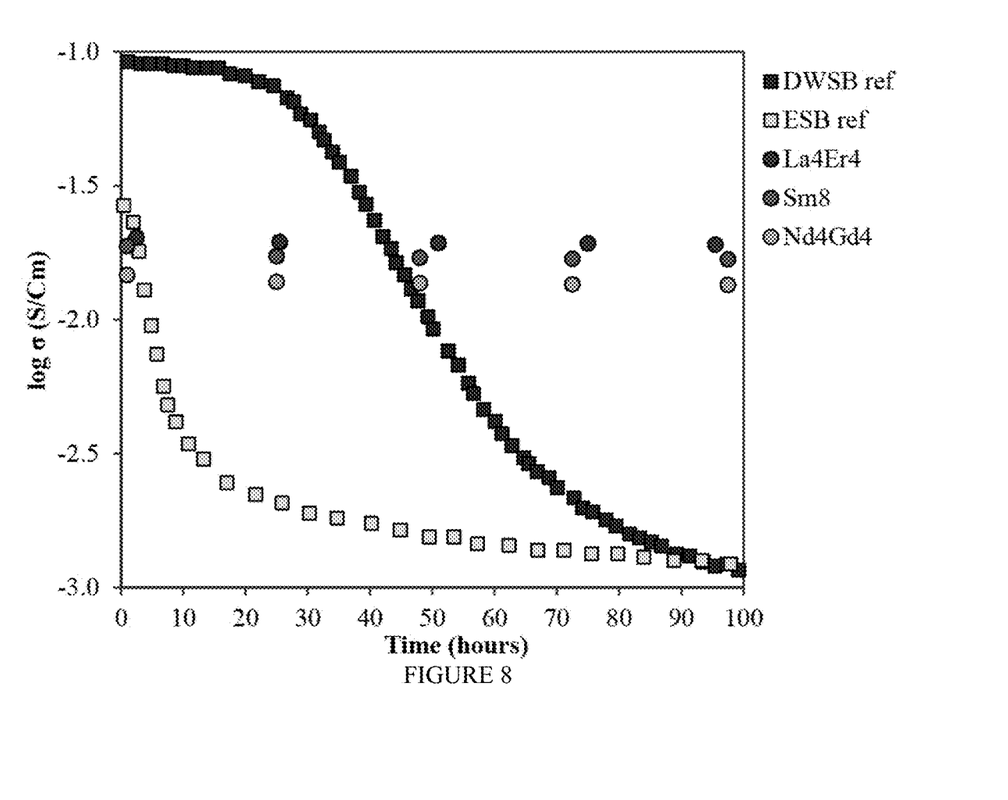
FIG. 8 show a graph of conductivity vs. time at 500° C. for 8% doped $Bi_2O_3$ samples with an average dopant ionic radius of approximately 108 pm. The name signifies the dopant, and the number after the dopant signifies the amount of the bismuth site that was substituted. DWSB and ESB are reference $Bi_2O_3$ materials in the FCC phase.

The dopant concentration was set at 8% and the ionic radius was held constant at approximately 108 pm to investigate the effect of the dopant properties on conductivity. For this study 4% substitution of both Nd and Gd for Bi (Nd4Gd4), 8% substitution of Sm for Bi (Sm8), and 4% substitution of both La and Er for Bi (La4Er4) were examined. Based upon aging results at 500° C. it is clear that the lanthanum doped sample exhibits superior conductivity, which is shown in FIG. 8.

Figure 9:
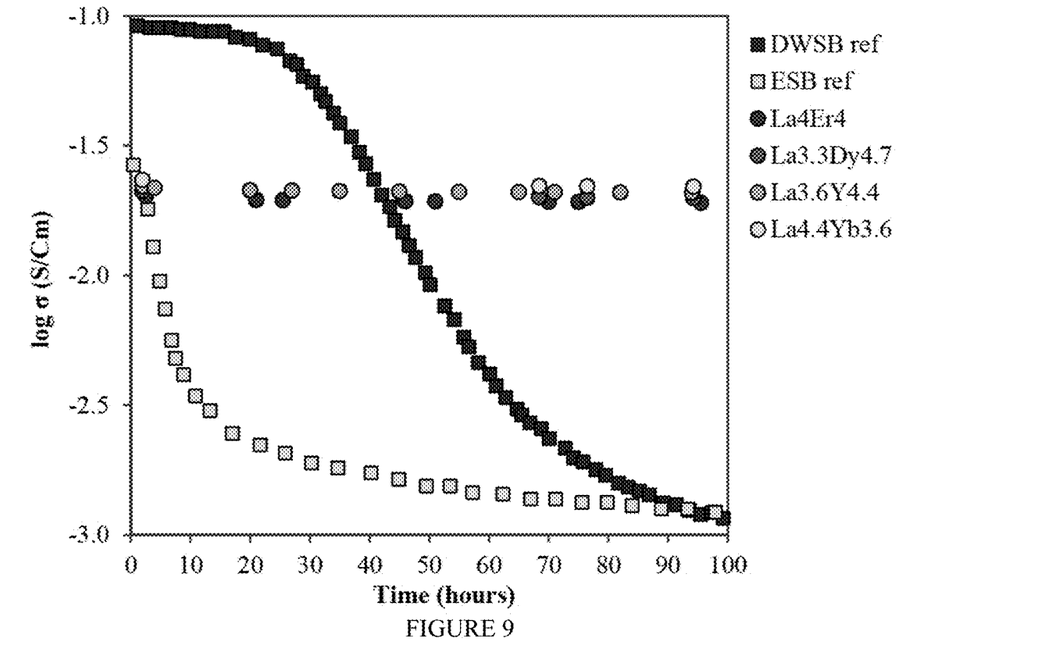
FIG. 9 is a graph of conductivity vs. time at 500° C. for 8% doped $Bi_2O_3$ samples containing La and an average dopant ionic radius of approximately 108 pm. The name signifies the dopant, and the number after the dopant signifies the amount of the bismuth site that was substituted. DWSB and ESB are reference $Bi_2O_3$ materials in the FCC phase.

The superior conductivity of the lanthanum-doped samples may be a result of the larger ionic radius of the lanthanum. While the average ionic radius is set at 108 pm, $Er^{+3}$ (100.4 pm) has a smaller size and is thus used to balance the much larger $La^{+3}$ (116 pm). The larger ionic radius of lanthanum may provide a larger conductivity pathway that the oxygen ion traverses. In fact, doping the bismuth site with lanthanum and a range of secondary dopants results in relatively high conductivity. FIG. 9 illustrates a host of 8% doped $Bi_2O_3$ that contain lanthanum and an average ionic radius of 108 pm. All the lanthanum containing samples shown here exhibit superior conductivity to the host of other non-lanthanum containing $Bi_2O_3$ samples.

Figure 10:
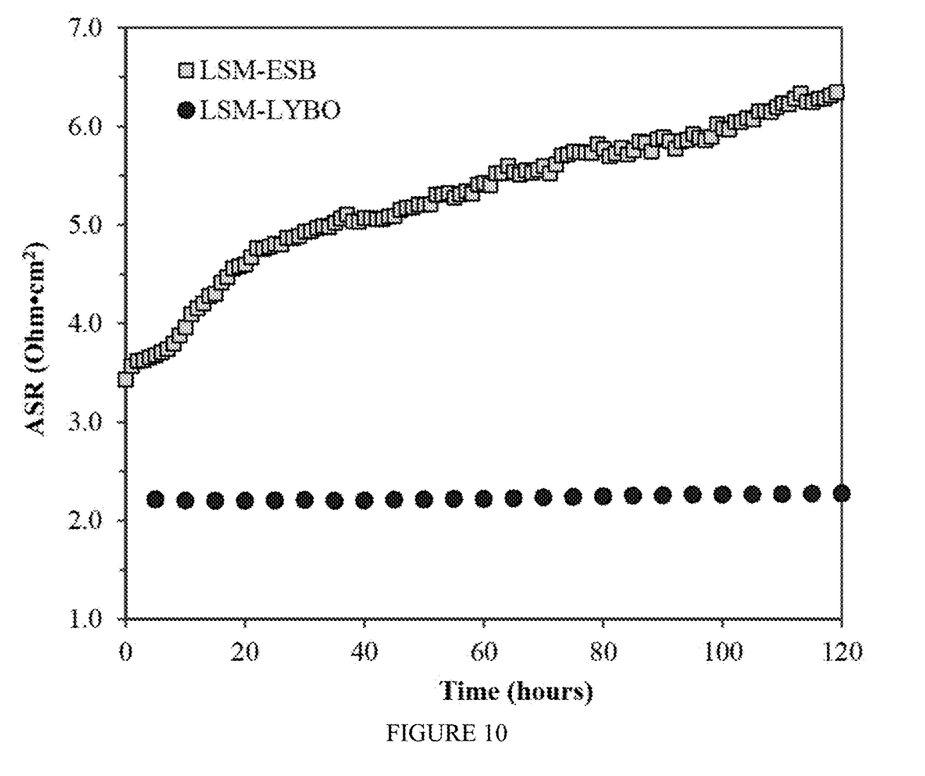
FIG. 10 is a graph of non-ohmic ASR as a function of time for two symmetric cells at 500° C. The composite cathode is 6:4 weight ratio of doped $Bi_2O_3$ to LSM. The cathode is deposited on a dense pellet of its component electrolyte.
Figure 11:
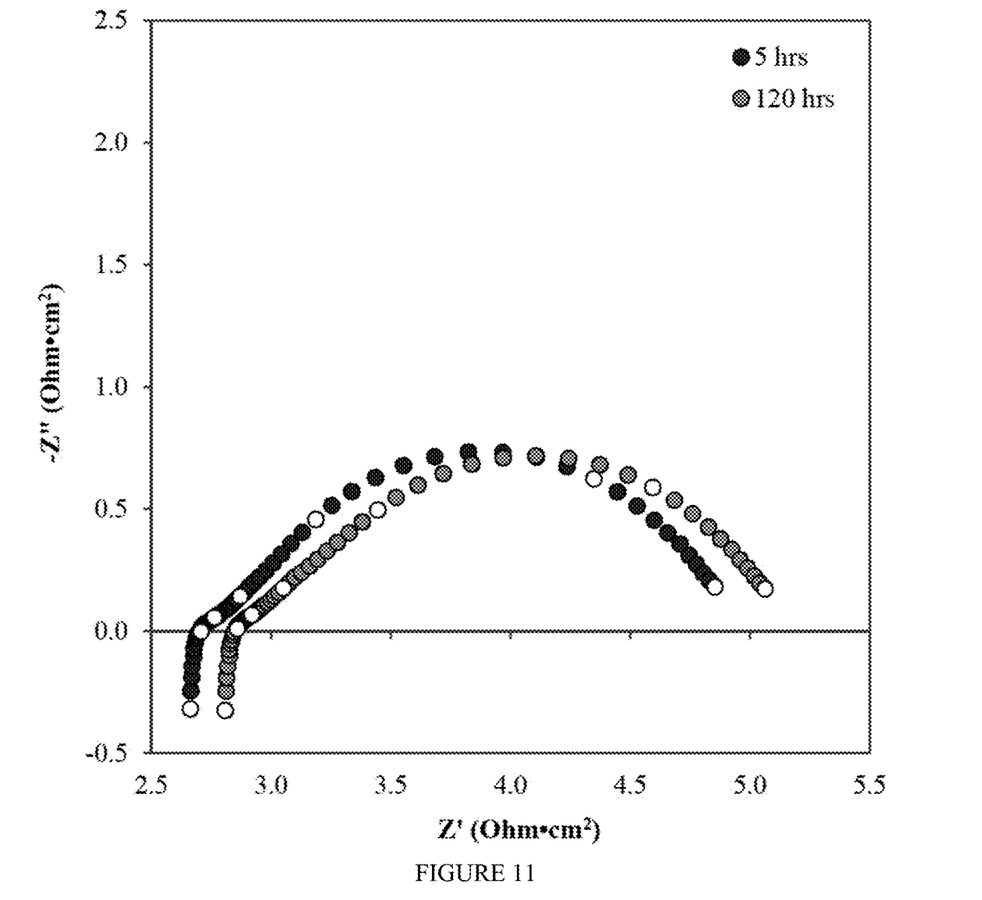
FIG. 11 shows impedance spectra of LSM-LYBO composite cathode after aging for 120 hours at 500° C. The open circles signify a one magnitude step in frequency from 100 Khz down to 0.1 hz.

Lanthanum-Yttrium doped $Bi_2O_3$ ("LYBO") exhibited the highest oxygen ion conductivity studied herein. Again without being bound by any theory, it is believed that the high conductivity of LYBO is due to the small overall dopant concentration and the majority of the substitution coming from lanthanum. Since it was highly conductive, LYBO was studied in a composite cathode design with LSM. A symmetric cell composed of the LSM-LYBO cathode on a dense pellet LYBO electrolyte was tested at 500° C. for one hundred hours. The cathodic performance of the LSM-LYBO half-cell was plotted against the performance of LSM-ESB. See FIG. 10. The EIS spectra of the LSM-LYBO symmetric cell is plotted in FIG. 11. Overall, the stability of the cathode performance is attributed to the stability of the ionic conductivity of LYBO. Meanwhile the ASR of the LSM-ESB composite cathode increased with time because of the large decay in the ESB conductivity.

Aging data for the rhombohedral bismuth oxide samples showed that the rhombohedral phase exhibited greater stability than cubic $Bi_2O_3$ at 500° C. Rhombohedral $Bi_2O_3$ has a wide range of synthesis routes, but doping the bismuth site with ≤10% of a cation will generally require a dopant ionic radius between 106 pm and 116 pm. While many different compositions of rhombohedral $Bi_2O_3$ are possible, samples with the lowest dopant concentration that also maintained a single phase exhibited the highest conductivity. Furthermore, $Bi_2O_3$ samples substituted with lanthanum showed superior conductivity to samples that had no lanthanum doping and similar dopant ionic radius and concentration. The stability and high conductivity of the rhombohedral bismuth oxide of the invention would allow for a good stable performance of a solid oxide fuel cell.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

What is claimed is:

1. A doped rhombohedral bismuth oxide that is phase-stable in a temperature range from about 10° C. to about 550° C., wherein said doped rhombohedral bismuth oxide maintains electric conductivity of at least about $1 \times 10^{-2}$ S/cm at a temperature of a bout 500° C. for at least about 100 hours, and wherein said rhombohedral bismuth oxide comprises at least two different dopants.

2. The doped rhombohedral bismuth oxide of claim 1, wherein an amount of bismuth ranges from about 70% to about 95% of a total metal content.

3. The doped rhombohedral bismuth oxide of claim 1, wherein said doped rhombohedral bismuth oxide comprises a first dopant and a second dopant, wherein each of said first dopant and said second dopant is independently selected from the group consisting of a lanthanide metal, a rare-earth metal, an alkali-earth metal, and a transition metal.

4. The doped rhombohedral bismuth oxide of claim 3, wherein a total amount of said first dopant and said second dopant ranges from about 4% to about 10% of the a total metal content.

5. The doped rhombohedral bismuth oxide of claim 3, wherein each of said first dopant and said second dopant is independently selected from the group consisting of La, Sm, Nd, Sr, Y, Er, Dy, Gd, Ca, and Yb.

6. The doped rhombohedral bismuth oxide of claim 5, wherein said first dopant comprises La, Sr, Nd, or Ca.

7. The doped rhombohedral bismuth oxide of claim 5, wherein said second dopant comprising Y, Sm, Er, Dy, or Gd.

8. A method for producing a doped rhombohedral bismuth oxide of claim 1, said method comprising doping a solid bismuth oxide with at least two different dopants to produce a mixture and producing said doped rhombohedral bismuth oxide from said mixture.

9. The method of claim 8, wherein said method of doping a solid bismuth oxide and producing said doped rhombohedral bismuth oxide comprises:
   admixing said solid bismuth oxide with at least two different dopants to produce a powder mixture;
   calcining said powder mixture at a temperature of at least 600° C. to produce a calcined mixture; and
   sintering said calcined mixture to produce said doped rhombohedral bismuth oxide.

10. The method of claim 8, wherein an amount of bismuth oxide in said mixture ranges from about 70% to about 95% of a total metal content.

11. The method of claim 9, wherein said powder mixture comprises a first dopant and a second dopant, wherein each of said first dopant and said second dopant is independently selected from the group consisting of a lanthanide metal, a rare-earth metal, an alkali-earth metal, and a transition metal.

12. The method of claim 11, wherein a total amount of said first dopant and said second dopant ranges from about 4% to about 10% of a total metal content.

13. The method of claim 11, wherein each of said first dopant and said second dopant is independently selected from the group consisting of La, Sm, Nd, Sr, Y, Er, Dy, Gd, Ca, and Yb.

14. The method of claim 13, wherein said first dopant comprises La, Sr, Nd, or Ca.

15. The method of claim 13, wherein said second dopant comprising Y, Sm, Er, Dy, or Gd.

16. A method for producing a rhombohedral bismuth oxide electrolyte, wherein said rhombohedral bismuth oxide electrolyte maintains electric conductivity of at least about $1 \times 10^{-2}$ S/cm at a temperature of about 500° C. for at least about 100 hours, said method comprising:
   admixing a solid bismuth oxide with a first dopant and a second dopant to produce a powder mixture;
   calcining said powder mixture at a temperature of at least 600° C. to produce a calcined mixture; and
   sintering said calcined mixture to produce said rhombohedral bismuth oxide electrolyte.

17. The method of claim 16, wherein a total amount of said first dopant and said second dopant ranges from about 4% to about 10% of a total metal content of said powder mixture.

18. The method of claim 16, wherein each of said first dopant and said second dopant is independently selected from the group consisting of La, Sm, Nd, Sr, Y, Er, Dy, Gd, Ca, and Yb.

19. The method of claim 18, wherein said first dopant comprises La, Sr, Nd, or Ca.

20. The method of claim 18, wherein said second dopant comprising Y, Sm, Er, Dy, or Gd.

* * * * *